Figure 1:
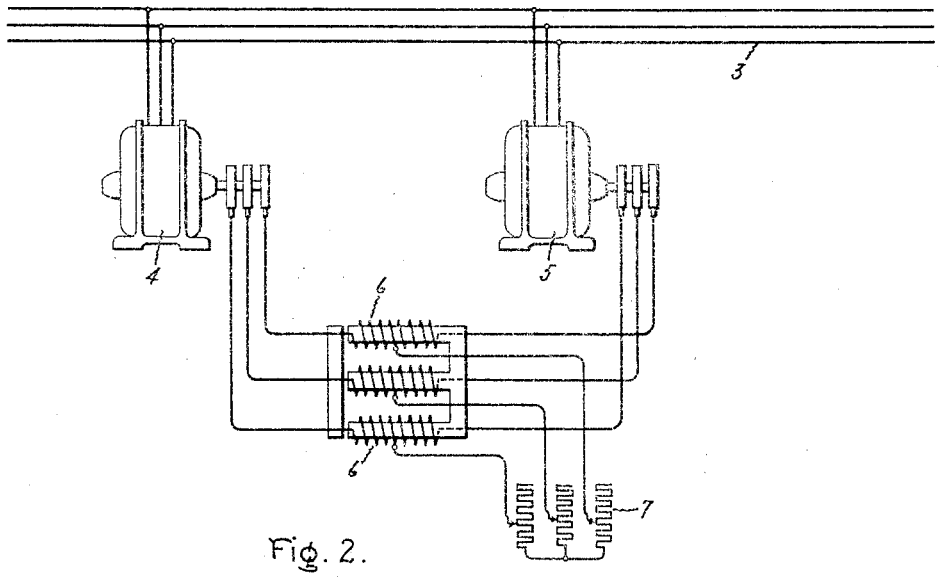

J. MARTIN.
REGULATING ARRANGEMENT FOR DYNAMO ELECTRIC MACHINES.
APPLICATION FILED MAY 29, 1916.

1,220,763.  Patented Mar. 27, 1917.

Inventor:
John Martin,
by Albert G. Davis
His Attorney.

UNITED STATES PATENT OFFICE.

JOHN MARTIN, OF CLIFTON, ENGLAND, ASSIGNOR TO GENERAL ELECTRIC COMPANY, A CORPORATION OF NEW YORK.

REGULATING ARRANGEMENT FOR DYNAMO-ELECTRIC MACHINES.

1,220,763.   Specification of Letters Patent.   Patented Mar. 27, 1917.

Application filed May 29, 1916. Serial No. 100,492.

*To all whom it may concern:*

Be it known that I, JOHN MARTIN, a subject of the King of Great Britain, residing at Clifton, in the county of Warwickshire, England, have invented certain new and useful Improvements in Regulating Arrangements for Dynamo-Electric Machines, of which the following is a specification.

This invention relates to regulating arrangements for dynamo electric machines and more particularly to arrangements for regulating induction motors, so that two or more of these motors may be run at exactly the same speed or the same proportional speeds without being mechanically coupled together.

In apparatus, such, for example, as long span cranes, it is often undesirable to provide a driving shaft extending from one end of the span to the other. In such a case a driving motor at each end might be necessary, but these motors to give good results should be arranged to run at exactly the same speed. Similarly, it is important that the motors driving different axles of a locomotive should run at the same speed. If the primary windings of these motors are connected to the supply in the usual way and the secondary terminals of the two motors are connected together, so that the secondary fields are in phase, the starting and controlling resistance being connected across the terminals of both, it will be found that if the starting resistances are open-circuited and the voltage is supplied to the primary windings of the two motors, equal and opposite voltages will be induced at the terminals of the two secondaries, with the result that the motors will remain at standstill; they will be electrically locked together in such a way that if one motor is turned by external force the other will follow. The action is the same as when two alternators are connected in parallel.

To get satisfactory operation at proportional speeds, it is necessary that the reactance component of the impedance of each machine should be large compared to the resistance component. With the rotors at standstill and full frequency on the primary windings this condition is easily complied with, as the full frequency gives sufficient reactance in the secondary windings to meet the desired conditions for good parallel operation. If, however, the rotors are allowed to run up to speed, the frequency in the secondary windings decreases, and at a certain speed the relative values of reactance and resistance components would become such that satisfactory parallel operation would not be obtained.

The object of my invention is to overcome the above difficulty and to that end it consists in connecting corresponding secondary terminals in parallel to the starting and controlling resistance through reactance in series. In the case of two motors, therefore, where the secondary windings are mounted upon the rotors, I connect corresponding slip rings together through reactance coils and tap the regulating resistance from the middle of the reactances.

Figure 2:
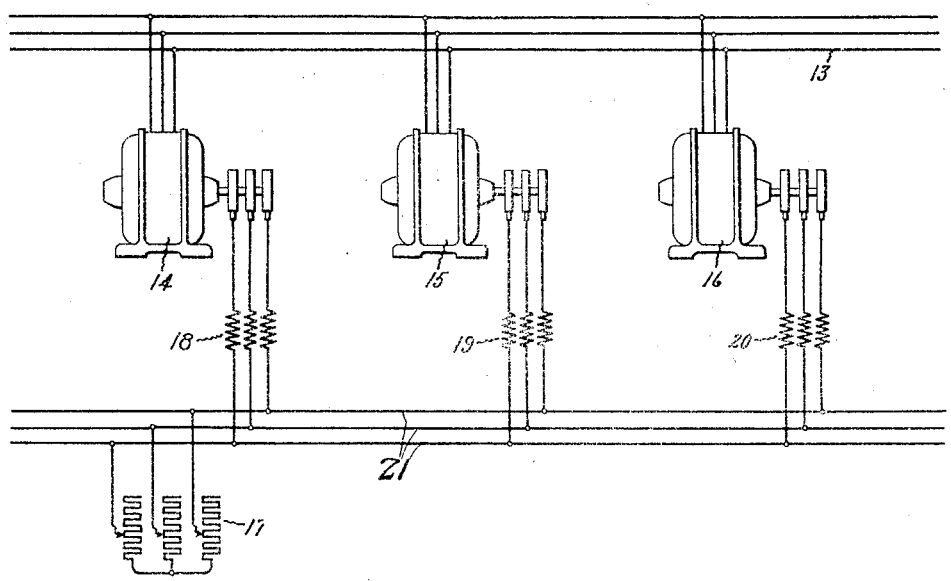

My invention will be more readily understood from the following specification when taken in connection with the accompanying drawing, in which:

Figure 1 is a diagram showing my invention applied to two motors. Fig. 2 is a similar diagram for more than two motors.

In Fig. 1, power is supplied from the mains 3 to the primary windings of the motors 4 and 5 having the same number of poles. The terminals of the secondary windings of each motor are brought out to slip rings and the corresponding phases are connected together through the series reactances 6. The starting and regulating resistance 7 is connected across the intermediate points, which are preferably the mid-points of the reactances 6 as shown.

So long as the two motors are running at exactly the same speed, the currents flowing from corresponding phases of the secondary windings into the regulating resistance will flow in opposite directions in the two halves of the winding on one leg of the reactance 6 and will give opposing magneto-motive forces which will neutralize, thus giving no reactive effect. As soon as the motors run at different speeds, however, and consequently produce secondary voltages which are out of phase, there will be a resultant voltage which will produce a circulating current between the two machines. This current would normally be so far out of phase with the secondary voltages that it would not produce a synchronizing torque tending to bring the two machines back to the same speed. In my arrangement the circulating current will give maximum flux in the core of the reactance 6, and hence maximum reactance, and will thus give the desired phase displacement to the circulating current so that it will produce a synchronizing torque which will bring the machine into step; *i. e.*, to the same speed.

I have found that a suitable value for the reactance component of the impedance for each rotor is 25 per cent. at normal load on the motor. With this arrangement good results are obtained but it is necessary that a certain amount of resistance should always be in circuit, that is, the regulating resistance should never be entirely short-circuited. If this were done the slip may diminish to such an extent that there would be practically no frequency in the rotor circuits and the motors would act independently and not run satisfactorily in parallel. I have found that so long as sufficient resistance is inserted to keep a slip of not less than 10 per cent. at normal load, the operation of the motors is satisfactory and identical speeds insured.

By providing the motors with different numbers of poles and connecting them to the same supply circuit and arranging the secondary circuits as above described the two motors will run at different speeds bearing a constant ratio to one another.

My invention may be applied to more than two rotors by connecting the corresponding phases of the secondary windings to the regulating resistance in parallel through reactances of equal value. The general arrangement will be understood from Fig. 2, which shows how three motors supplied with power from mains 13, are connected in accordance with my invention. The corresponding secondary terminals of the motors 14, 15, 16 are connected in parallel to the bus bars 21 through the reactances 18, 19, 20 of equal value. The regulating resistance 17 is connected to the bus bars 21 to control all the motors in parallel.

While I have herein shown certain specific arrangements of my invention, it will be understood that various modifications can readily be made, and I seek, therefore, to cover in the appended claims all those modifications and variations which come within the true scope and spirit of my invention.

What I claim as new and desire to secure by Letters Patent of the United States, is:—

1. In combination, a source of supply, a plurality of induction motors having their primary windings connected to said source, reactances, regulating resistances, and means for connecting corresponding phases of the secondary windings of said motors in parallel to the regulating resistances through said reactances.

2. In combination, a source of supply, a pair of induction motors having their primary windings connected to said source, reactances interconnecting the terminals of corresponding phases of the secondary windings of said motors, and regulating resistances interconnecting intermediate points of said reactances.

3. In combination, a source of supply, a pair of induction motors having their primary windings connected to said source, reactances interconnecting the terminals of corresponding phases of the secondary windings of said motors, and regulating resistances interconnecting midpoints of said reactances.

4. In combination, a source of supply, a pair of induction motors having their primary windings connected to said source, reactances interconnecting the terminals of corresponding phases of the secondary windings of said motors, the reactance in any one phase comprising two portions wound in the same direction upon a common core, and regulating resistances interconnecting midpoints of said reactances.

In witness whereof, I have hereunto set my hand this tenth day of May 1916.

JOHN MARTIN.

Witnesses:
 CHARLES H. FULLER,
 J. A. FOSTER.